June 16, 1942.　　P. M. FREER　　2,286,532
FRICTION COUPLING
Filed Aug. 2, 1940　　3 Sheets-Sheet 1

INVENTOR.
PHELPS M. FREER
ATTORNEYS

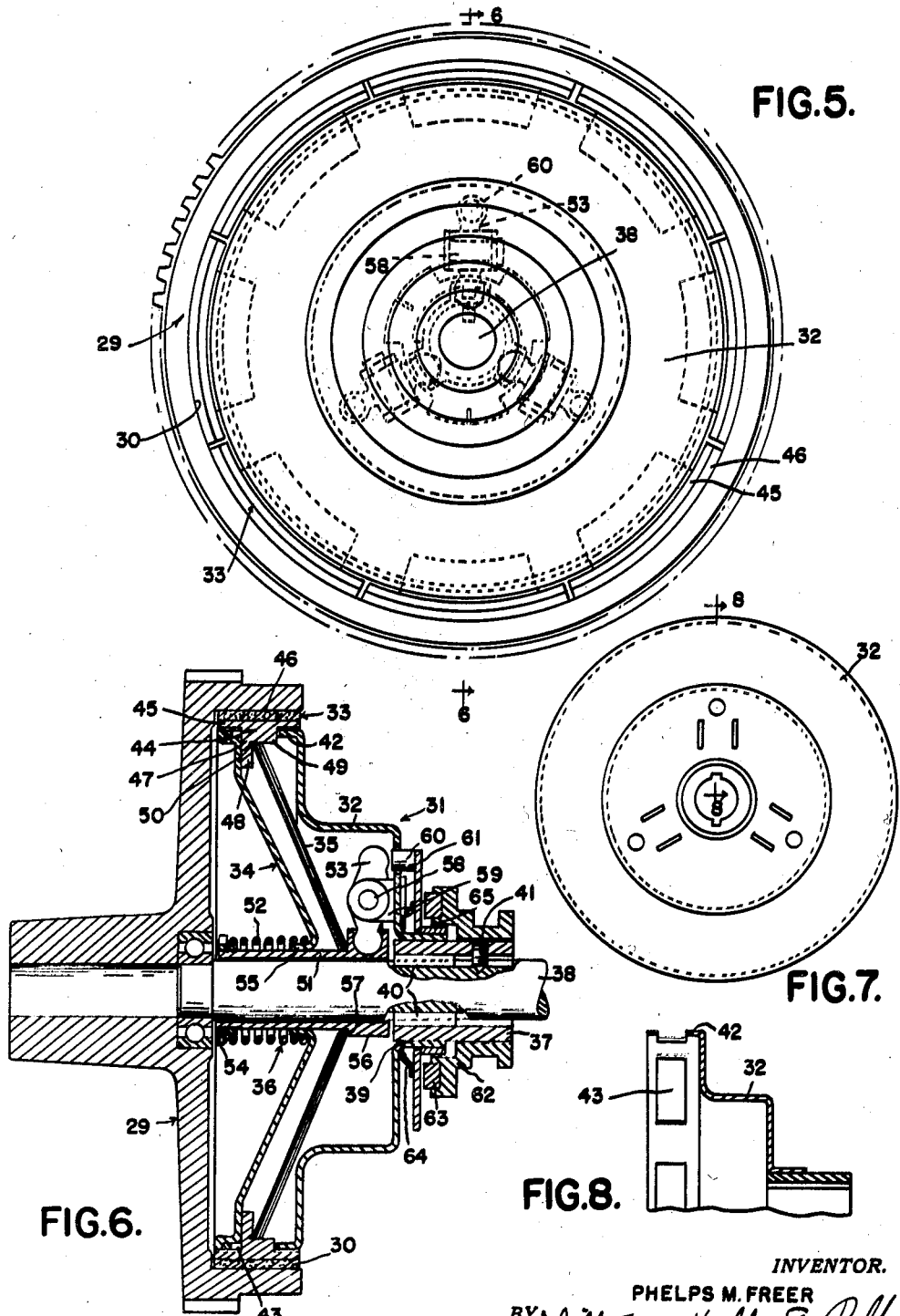

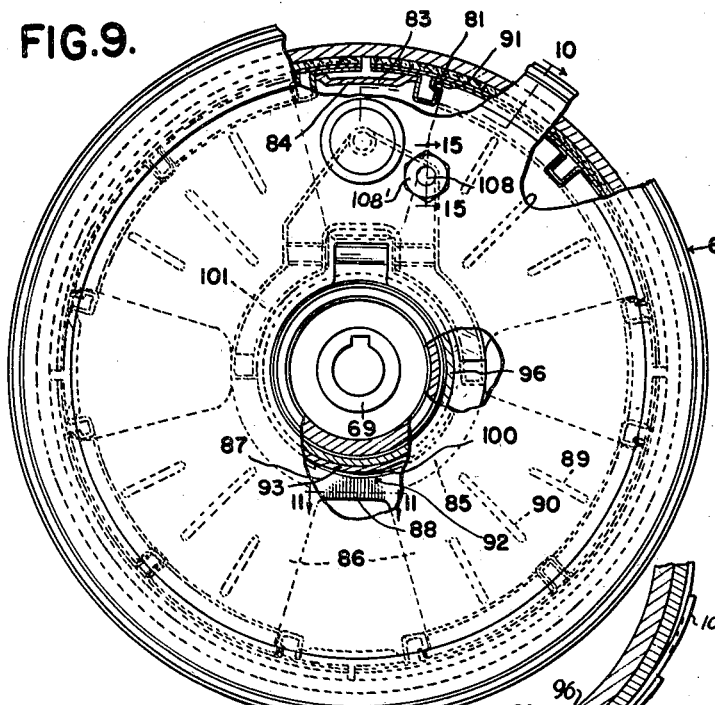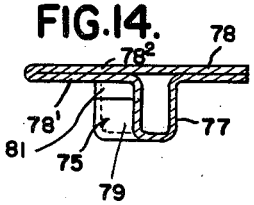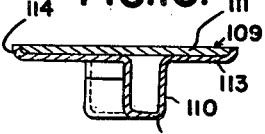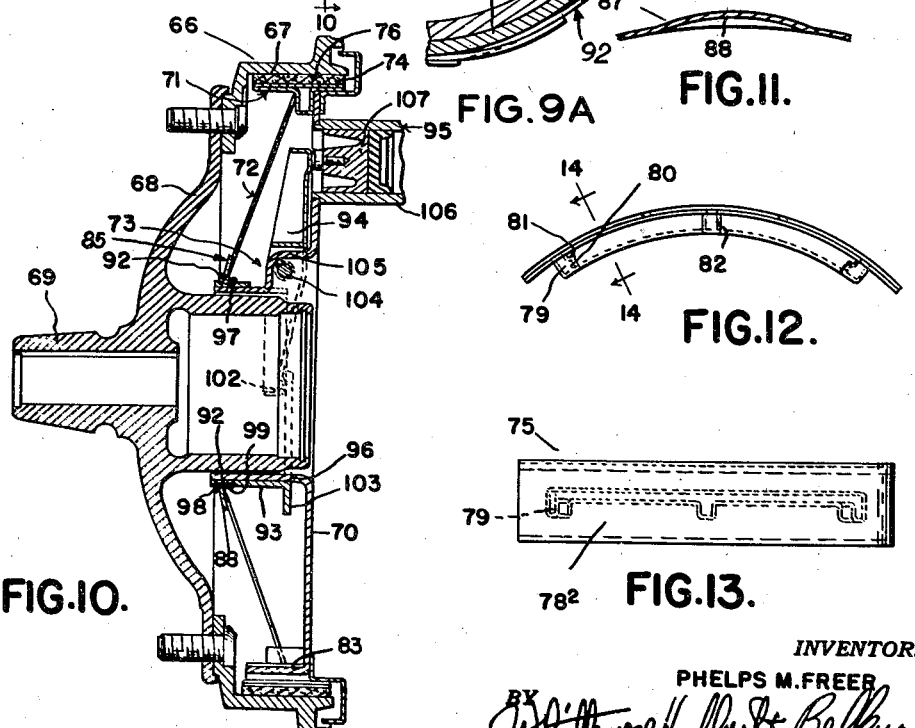

Patented June 16, 1942

2,286,532

UNITED STATES PATENT OFFICE 2,286,532

FRICTION COUPLING

Phelps M. Freer, Detroit, Mich.

Application August 2, 1940, Serial No. 349,882

32 Claims. (Cl. 188—78)

The invention relates to friction couplings for effecting a common state of motion or rest of two relatively rotatable elements. If both elements are rotatable, the coupling is a clutch, while if one element is rotatable and the other is non-rotatable, the coupling is a brake.

The invention has for one object to provide an improved friction coupling in which the element including the movable friction member which is adapted to be engaged with and disengaged from the other element forms a self-contained unit.

The invention has for another object to provide a friction coupling in which the element including the movable friction member comprises a plate and means for moving the friction member relative to the plate, the means comprising a member the inner portion of which is axially movable and the outer portion of which is radially movable.

The invention has for a further object to provide a friction coupling having a resilient dished actuating disc which expands when flattened to effect engagement of the relatively rotatable elements and which contracts when in its normal state to effect disengagement of the relatively rotatable elements.

The invention has for a still further object to provide a friction coupling in which one element is so arranged that its resilient dished actuating disc exerts thrust upon its movable friction member in a direction to hold the same against its plate.

The invention has for still other objects to provide a friction coupling in which the actuating member radially moves the movable friction member toward and away from the other element of the coupling and the operative connection provides for peripheral movement of the friction member relative to the actuating member to minimize torsional stresses on the actuating member; to provide an improved actuating disc; and to provide an improved construction of friction member.

These and other objects of the invention will become apparent from the following description and claims, taken in connection with the accompanying drawings, in which Figure 1 is an elevation of one type of friction coupling embodying my invention;

Figure 5 is an elevation of another type of friction coupling embodying my invention;

Figure 6 is a cross section on the line 6—6 of Figure 5;

Figure 7 is an elevation of the cage plate;

Figure 8 is a cross section on the line 8—8 of Figure 7;

Figure 9 is an elevation, partly broken away, of a friction coupling showing another embodiment of my invention;

Figure 9A is an enlarged view of a portion of Figure 9;

Figure 10 is a cross section on the line 10—10 of Figure 9;

Figure 11 is an enlarged cross section on the line 11—11 of Figure 9;

Figure 12 is a reduced elevation of one of the shoes of the friction member;

Figure 13 is a plan view thereof;

Figure 14 is an enlarged cross section on the line 14—14 of Figure 12;

Figure 15 is an enlarged cross section on the line 15—15 of Figure 9;

Figure 16 is a view similar to Figure 14 showing another construction of shoe.

Figure 1:
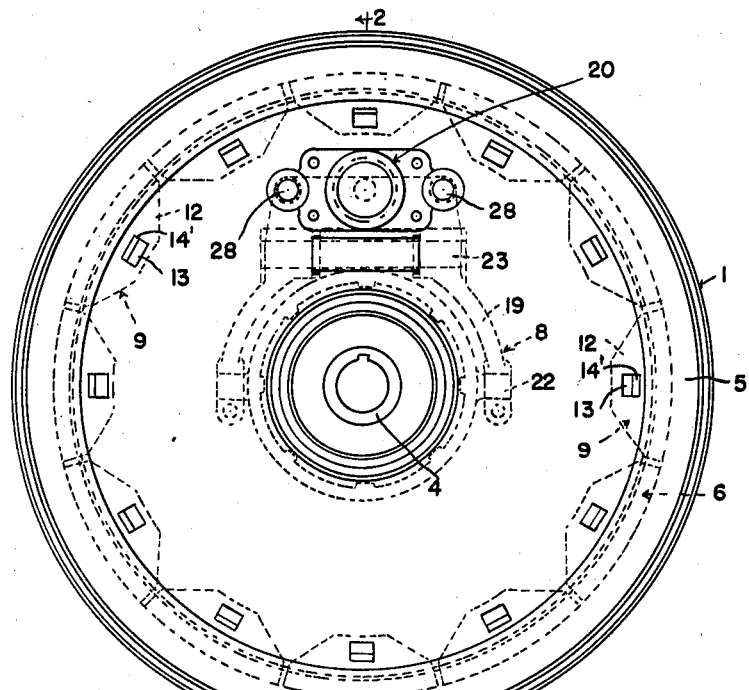
Figures 2, 3, 4:
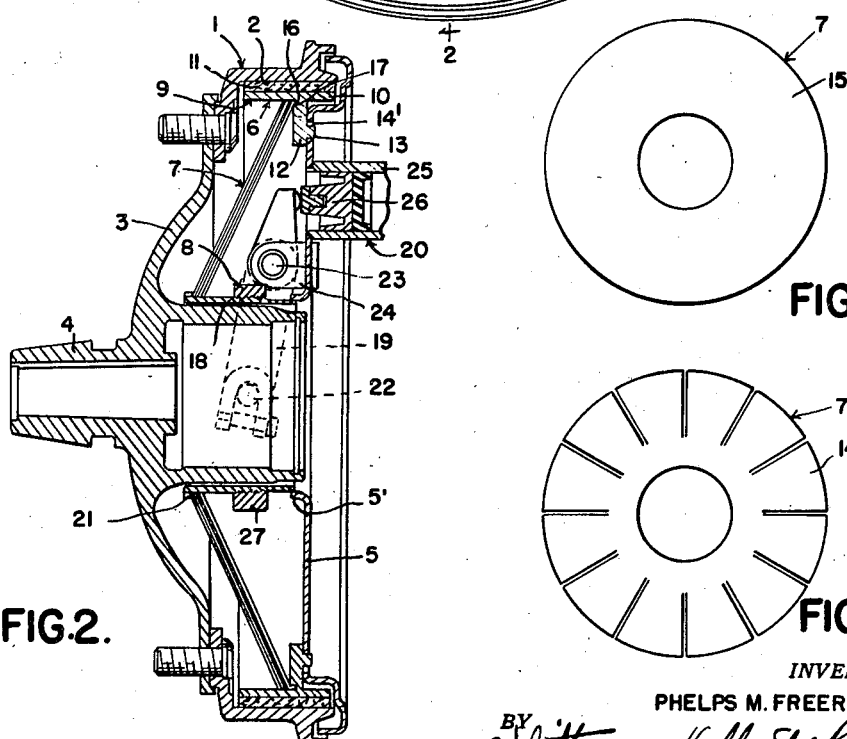
Figure 2 is a cross section on the line 2—2 of Figure 1.
Figures 3 and 4 are reduced elevations of the resilient dished actuating discs.

The friction coupling illustrated in Figures 1 to 4, inclusive, is a brake in which one of the elements is rotatable and the other of the elements is non-rotatable. The rotatable element comprises the brake drum 1 having the internal friction face 2. This brake drum, as shown, is mounted upon the fixed flange 3 of the hub 4, the fixed flange being provided with suitable means for securing a vehicle wheel thereto.

The non-rotatable element forms a self-contained unit and comprises the backing plate 5, the friction member 6 engageable with the internal friction face 2 of the brake drum, the dished discs 7 for actuating the friction member, and the mechanism 8 for actuating the discs. The backing plate is fixed either upon the axle housing or the steering spindle of the vehicle. The friction member 6 is formed of the series of T-section brake shoes 9 having the arcuate flanges 10 which are provided with a suitable lining 11 for engaging the internal friction face 2 of the brake drum. The radial flanges 12 of the brake shoes slidably engage the backing plate 5 and they are provided with the lateral projections 13 which extend through the radial openings 14′ in the backing plate. The arrangement is such that the brake shoes are radially guided by the backing plate to be movable radially into and out of engagement with the internal friction face of the brake drum. Also, that the brake shoes are held from peripheral movement relative to the backing plate.

The dished discs 7 are resilient, being formed of spring material, and they are dished rearwardly and toward the radial flanges 12 of the brake shoes and retain these flanges against the backing plate. These dished discs preferably comprise alternate spoked and solid discs 14 and 15, respectively, contacting at their outer edges with the arcuate flanges 10 of the brake shoes adjacent their radial flanges. The disc immediately adjacent the radial flanges is formed with the lateral projections 16 for engaging in the lateral notch 17 in each of the radial flanges. In the event that the rear disc is a solid disc, the lateral projections 16 are formed by slitting the lateral peripheral portion of the disc, while in the event that the rear disc is spoked, the lateral projections are formed merely by the lateral ends of the spokes, there being one spoke to each brake shoe.

The actuating mechanism 8 comprises the sleeve 18, the lever 19 for actuating the sleeve and the wheel cylinder 20 for actuating the lever. The sleeve encircles and is preferably spaced from the rear portion of the hub 4 and slidably engages the forwardly turned annular flange 5' of the backing plate 5. The front end of the sleeve is formed with the radial flange 21 against which the inner edge of the front dished disc 7 engages, this edge and also the inner edges of the other discs also encircling and engaging the sleeve. The lever 19 is bifurcated and its furcations are connected to the pins 22 at diametrically opposite sides of the collar 27 which is threaded upon the sleeve. The lever is mounted upon the shaft 23 which is carried by the bracket 24, the base of which is at the rear side of and secured to the backing plate and the arms of which carrying the shaft extend through openings in the backing plate. The wheel cylinder is formed in any usual manner and, as shown, comprises the cylinder 25 and the piston 26, the latter being engageable with the free end of the lever.

In operation, it will be seen that when the braking liquid is forced into the wheel cylinder 20, the dished discs will be flattened through the intermediate sleeve 18 and the lever 19. The flattening of the discs causes them to expand and, as a consequence, to move the brake shoes radially outwardly against the internal friction face of the brake drum, thereby applying the brake. Upon release of pressure of the braking liquid, the dished discs, because of their inherent resiliency, resume their normal dished states and contract and the rear disc moves the brake shoes radially inwardly. At the same time, the discs axially move the sleeve 18 forwardly to its normal position and this, in turn, moves the lever 19 to its normal position. The normal positions are determined by engagement of the lateral projections upon the brake shoes engaging the radially inner ends of the openings in the backing plate. As a result, the brake shoes, discs and sleeves are centered as a unit relative to the brake drum.

The brake may also be mechanically operated and, as shown in the present instance, there are the rods 28 extending transversely through the backing plate 5 at diametrically opposite sides of the wheel cylinder 20. The front ends of these rods are engageable with the free end of the lever 19 and are adapted to swing this lever to apply the brake upon being moved by suitable means (not shown).

The friction coupling illustrated in Figures 5 to 8, inclusive, is a clutch in which both of the elements are rotatable. The driving element 29 has the internal friction face 30. The driven element 31 forms a self-contained unit and comprises the cage plate 32, the friction member 33 engageable with the internal friction face 30, the backing plate 34, the dished discs 35 for actuating the friction member, and the mechanism 36 for actuating the discs. The cage plate 32 is fixed upon the bushing 37 which, in turn, is fixed upon the driven shaft 38. More in detail, the cage plate has the reduced cylindrical flange 39 which may be pinned or welded to the bushing and the bushing, as shown, is non-rotatably secured to the shaft by the keys 40 and also held from longitudinal movement on the shaft by the set screw 41. The cage plate is formed with the peripheral flange 42 which preferably has a light press fit with the peripheral portion of the backing plate 34. The flange has the annular series of rectangular openings 43 therethrough. The friction member 33 is formed of the series of T-section shoes 44 having the arcuate flanges 45 which are provided with a suitable lining 46 for engaging the internal friction face 30. The radial flanges 47 of the shoes extend through the openings 43 with clearance between their sides and the side edges of the openings. However, the shoes have sliding fit between their ends and the end edges of the openings so that the cage plate radially guides the shoes and the latter cannot move peripherally relative to the former. These radial flanges have radially inwardly extending projecting portions 48 engageable with the backing plate 34 and adapted to slide radially thereover.

The dished discs 35 are formed in the same manner as the dished discs 7 and they are dished toward the radially inwardly extending portions 48 of the radial flanges of the shoes to retain these portions against the backing plate. The outer edges of these discs engage the radially inner faces 49 of the shoes and the disc immediately adjacent to the portions 48 have lateral portions engaging in the notches 50 of the shoes. These lateral portions are formed in the same manner as the lateral portions of the rear disc 7.

The actuating mechanism 36 comprises the sleeve 51 encircling and preferably spaced from the shaft 38, the coil spring 52 acting upon the backing plate and sleeve and the levers 53 for mechanically moving the sleeve. The coil spring 52 abuts the collar 54 threaded upon one end of the sleeve and the central portion of the backing plate 34 which is located between the collar and the dished discs and has the cylindrical flange 55 slidably mounted upon the sleeve. The other end of the sleeve is provided with the annular projection 56 which provides the shoulder 57 for engagement by the inner edge of the immediately adjacent disc, this inner edge and also the inner edges of the other discs engaging the sleeve adjacent the shoulder. The levers 53 are journaled upon the pins 58 which are secured to the brackets 59 formed in the same manner as the bracket 24. The radially inner ends of the levers are connected to the projection 56 of the sleeve, while the radially outer ends are adapted to be engaged by the pins 60. These pins extend axially through the cage plate and are carried upon the plate 61 which is sleeved over the cylindrical flange 39 of the cage plate. The plate 61 is adapted to be moved in a direction to actuate the levers by means of the collar 62 through the bearing 63. The collar is movable longitudinally over the bushing 37 and is held in spaced concentric relation thereto by means of the yoke for shifting the collar. 64 is a spring between the cage plate 32 and the plate 61 for resiliently urging the latter away from the former and for holding the latter against the stop collar 65 fixed upon the flange 39 of the cage plate.

The construction is such that the coil spring 52 resiliently urges the sleeve 51 in a direction to flatten the dished discs 35 and thereby expand the same to hold the shoes in effective engagement with the internal friction face 30 of the driving element. The coil spring also holds the backing plate 34 against the shoes. The cage plate 32 is fixedly mounted upon the driven shaft 38 in a position such that the edge of the peripheral flange of the plate abuts the peripheral portion of the backing plate and, as a result, the driven element forms a self-contained unit which can be assembled with the driving element. This is accomplished after moving the actuating collar 62 in a direction to swing the levers 53 and to thereby move the sleeve against the compression of the coil spring to allow the dished discs, by reason of their inherent resiliency, to contract and move the shoes radially inwardly. It will be noted that the driven shaft has an end journaled in the driving element.

In operation, the discs are normally in flattened state by reason of the compression spring so that the discs are expanded to hold the shoes in effective engagement with the internal friction face. To release the clutch, the spring is compressed to allow the discs to take a greater dish to thereby contract and disengage the shoes from the driving member.

This application is a continuation in part of my copending application, Serial No. 271,755, filed May 4, 1939, and the part thus far described is a duplicate thereof.

The friction coupling illustrated in Figures 9 to 15, inclusive, is a brake in which the rotatable element comprises the brake drum 66 having the internal friction face 67. The brake drum, as shown, is mounted upon the fixed flange 68 of the hub 69, the fixed flange being provided with suitable means for securing a vehicle wheel thereto.

The non-rotatable element of the brake preferably forms a self-contained unit and comprises the backing plate 70, the friction member 71 engageable with the internal friction face 67 of the brake drum, the dished disc 72 for actuating the friction member, and the mechanism 73 for actuating the disc. The backing plate is fixed either upon the axle housing or the steering spindle of the vehicle. The friction member 71 is formed of the series of generally T-section brake shoes 74 each having the sheet metal body 75 and a suitable lining 76 for engaging the internal friction face of the brake drum. Each sheet metal body has the generally channel-shaped web 77 and the axial flange 78 which extends beyond the sides of the web. The body, as shown particularly in Figures 12, 13 and 14, is formed in one piece and is longitudinally arcuate with a radius of curvature such that when the lining 76 is applied, the latter will contact throughout its extent with the internal friction face of the brake drum. The axial flange is formed of the axially aligned radial inner portions 78' which extend in opposite directions from the webs 77 and the radial outer portion 78² which extends integrally from a side edge of one of the portions 78' and is seam-welded to both of the portions 78' longitudinally of the body. The web has near its ends the axial portions 79 which are provided with the projections 80 extending peripherally toward the middle of the body and radially spaced from the axial flange 78 to provide the recesses 81 opening peripherally toward the middle of the body. The web also has at its middle the axial reinforcing portion 82. The side of the web opposite the axial portions slidably engages the backing plate 70. The ends of the axial portions 79 opposite the projections 80 are slidably engageable with the side edges of the tongues 83 which extend axially from the periphery of the backing plate 70 and are preferably integral therewith. The tongues are preferably depressed axially to, in effect, form reinforcing ribs 84. The construction is such that the shoe bodies being formed of sheet metal are of relatively light weight and may be economically manufactured. Also, they are guided radially by the backing plate and its tongues, the latter serving as abutments for the shoes to limit their peripheral movement. It will also be noted that the shoes extend peripherally over the tongues and terminate adjacent to each other so that they are adapted to have nearly 360 degrees of contact with the internal friction face of the brake drum.

The dished disc 72 is resilient, being formed of spring material, and it is dished rearwardly and toward the webs of the brake shoes and retain these webs against the backing plate. The disc has the hub 85 and the spokes 86 radiating from the hub, there being preferably one spoke for each brake shoe. The portions 87 of the hub between and connecting the spokes are peripherally bowed in an axial direction progressively from a zone near the inner edge of the hub to the outer edge thereof, as at 88. The spokes are formed with the radial slots 90 at their centers and with the radial slots 89 substantially midway between the center slots and the side edges of the spokes. The center slots preferably terminate near the outer edge of the hub, while the other slots terminate preferably near the outer edges of the spokes. The bowed portions of the hub provide added material peripherally of the hub to prevent excessive stretching when the disc is axially compressed and radially expanded, the radial expansion taking place in the hub. The radial slotting of the spokes permits flattening of the spokes in an axial direction when the disc is axially compressed, the spokes being normally bowed peripherally. The radial slots also substantially equalize the stresses on the spokes and permit easier axial compression of the disc. Each spoke has at the outer end of its side edge the peripheral projection 91 which has a radial dimension to closely fit in the adjacent recess 81 of the associated brake shoe. As a result, each spoke is connected to its brake shoe to positively move the same radially toward or away from the internal friction face of the brake drum without any lost motion. However, the connection between each spoke and its brake shoe provides for peripheral movement of the brake shoe relative to the spoke, there being clearance between the side edges of each spoke and the ends of the projections and the axial portions of the brake shoes and also clearance between the portions of the spoke adjacent the middle axial portion of the brake shoe. By reason of this construction, the actuating disc positively moves the brake shoes toward and away from the internal friction face of the brake drum and at the same time the spokes of the disc are free from torsion, except that resulting from friction between the brake shoes and the spokes when the former move peripherally relative to the latter.

The actuating mechanism 73 comprises the mounting collar 92, the sleeve 93, the lever 94, and the wheel cylinder 95 for actuating the latter. The sleeve encircles and engages the forwardly turned flange 96 of the backing plate 70, the annular flange encircling and being preferably spaced from the rear portion of the hub 69. The front end of the sleeve is formed with the annular groove 97 in which is located the transversely split resilient mounting collar 92. The mounting collar is formed with the radial flange 98 and the axial flange 99, which latter is provided with the annular series of peripherally extending resilient tongues 100 struck out therefrom. The radial flange abuts the front face of the hub 85 of the disc and the resilient tongues abut the inner edge of the hub of the disc and normally hold the disc and also the brake shoes connected thereto in centered relation to the sleeve and backing plate. The lever 94 is bifurcated and the ends of its furcations 101 are formed with the rounded bearings 102 for engaging the front face of the substantially semicircular radial flange 103 formed upon the rear end of the sleeve 93. The lever is mounted upon the ends of the shaft 104 which extends through the depression 105 in the backing plate. It will be noted that the lever is formed of sheet metal and reinforced by flanges extending axially of the brake, these flanges, in effect, making the furcations of the lever channel-shaped. The wheel cylinder is formed in any usual manner and, as shown, comprises the cylinder 106 and the piston 107, the latter being engageable with the free end of the lever. The lever may also be actuated mechanically as by means of the axially movable rod 108 extending through the backing plate and engageable with the free end of the lever.

In operation, it will be seen that when the braking liquid is forced into the wheel cylinder 95 the dished disc will be flattened through the intermediate mounting collar 92, the sleeve 93 and the lever 94. The flattening of the disc causes the same to expand and increase its outer diameter and thereby move the brake shoes radially outwardly against the internal friction face of the brake drum, thereby applying the brake. By reason of the resilient mounting collar, the brake shoes and actuating disc are allowed to center with respect to the brake drum and, more particularly, its internal friction face to thereby secure more complete and uniform contact. At the same time, the resilient mounting permits of the slight contraction of the hub of the disc during the flattening. Upon release of pressure of the braking liquid, the actuating disc because of its inherent resiliency assumes its normal dished state and in contracting moves the shoes radially inwardly and away from the internal friction face of the brake drum. At the same time, the disc axially moves the sleeve 93 outwardly to its normal position and this in turn moves the lever 94 to its normal position, the positions being determined by engagement of the nipple 108' with the lever 94. As shown in Figure 15, the nipple is adjustably threaded into the backing plate to vary the normal positions of the parts.

Figure 16 discloses a modified construction of brake shoe in which the sheet metal body 109 is formed of the radially inner and outer sheet metal elements 110 and 111, respectively. The former is provided with the generally channel-shaped web 112 and the axial flange portions 113 extending from opposite sides of the web. The web is formed with axial portions in exactly the same manner as those particularly illustrated in Figures 11, 12 and 13. The outer sheet metal member is secured against the axial flange portions by longitudinal seam welds and located between the radial terminal flanges 114 at the edges of the axial flange portions 113.

What I claim as my invention is:

1. In a friction coupling, the combination of two relatively rotatable elements, one of said elements having an internal friction face and the other of said elements being a self-contained unit comprising a plate, a friction member movable relative to said plate and engageable with said internal friction face, and actuating means comprising a resilient dished disc operatively connected to said friction member and adapted when being flattened to expand and radially move said friction member against said internal friction face and when being allowed to resume its normal dish to contract and radially move said friction member away from said internal friction face.

2. In a friction coupling, the combination of two relatively rotatable elements, one of said elements having an internal friction face and the other of said elements being a self-contained unit comprising a plate, a friction member movable relative to said plate and engageable with said internal friction face, and actuating means comprising a resilient dished disc operatively connected to said friction member and adapted when being flattened to expand and radially move said friction member against said internal friction face and when being allowed to resume its normal dish to contract and radially move said friction member away from said internal friction face, said actuating means also comprising a reciprocable member operatively connected to the central portion of said disc.

3. In a friction coupling, the combination of two relatively rotatable elements, one of said elements having an internal friction face and the other of said elements being a self-contained unit comprising a plate, a friction member, and actuating means comprising a resilient dished disc, a reciprocable member operatively connected to the central portion of said disc, and lever means for actuating said reciprocable member, said disc being operatively connected at its outer edge to said friction member and adapted when being flattened to expand and radially move said friction member against said internal friction face and when being allowed to resume its normal dish to contract and radially move said friction member away from said internal friction face.

4. In a friction coupling, the combination of two relatively rotatable elements, one of said elements having an internal friction face and the other of said elements comprising a plate, a friction member slidable upon said plate and engageable with said internal friction face, and actuating means comprising a disc dished toward and holding said friction member against said plate and adapted when being flattened to expand and move said friction member against said internal friction face and when being allowed to resume its normal dish to contract and move said friction member away from said internal friction face.

5. In a friction coupling, the combination of two relatively rotatable elements, one of said elements having an internal friction face and the other of said elements comprising a plate, a friction member slidable upon said plate, and actuating means comprising a resilient dished disc operatively connected at its outer edge to said friction member, and a longitudinally reciprocable sleeve operatively connected to the inner edge of said disc, said disc holding said friction member against said plate and being adapted when being flattened to expand and move said friction member against said internal friction face and when being allowed to resume its normal dish to contract and move said friction member away from said internal friction face.

6. In a friction coupling, the combination of a rotatable element and a non-rotatable element, said rotatable element having an internal friction face and said non-rotatable element comprising a backing plate, an annular series of brake shoes slidably engaging said plate and movable radially toward and away from said internal friction face, and actuating means comprising a resilient dished disc operatively connected at its outer edge to said brake shoes and adapted when being flattened to expand and move said brake shoes against said internal friction face and when being allowed to resume its normal dish to contact and move said brake shoes out of engagement with said internal friction face.

7. In a friction coupling, the combination of a rotatable element and a non-rotatable element, said rotatable element having an internal friction face and said non-rotatable element being a self-contained unit, comprising a backing plate, brake shoes slidable upon said backing plate and movable radially toward and away from said internal friction face, and actuating means comprising a resilient dished disc operatively connected at its outer edge to said brake shoes, a longitudinally reciprocable sleeve operatively connected to the inner edge of said disc, and means mounted upon said plate for reciprocating said sleeve, said disc being adapted when being flattened to expand and move said brake shoes against said internal friction face and when being allowed to resume its normal dish to contract and move said brake shoes out of engagement with said internal friction face.

8. In a friction coupling, the combination of two rotatable elements, one of said elements having an internal friction face and the other of said elements comprising a plate, a friction member movable radially relative to said plate and engageable with said internal friction face, and actuating means comprising a resilient dished disc operatively connected at its outer edge to said friction member, and spring means acting upon the central portion of said disc in a direction flattening the same whereby said disc holds said friction member against said internal friction face.

9. In a friction coupling, the combination of two rotatable elements, one of said elements having an internal friction face and the other of said elements comprising a plate, a friction member movably radially relative to said plate and engageable with said internal friction face, and actuating means comprising a resilient dished disc operatively connected at its outer edge to said friction member, spring means acting upon the central portion of said disc in a drection flattening the same whereby said disc holds said friction member against said internal friction face, and means for relieving the pressure of said spring upon said disc whereby said disc is allowed to take a greater dish to contract and move said friction member out of engagement with said internal friction face.

10. In a friction coupling, the combination of two rotatable elements, one of said elements having an internal friction face and the other of said elements comprising a backing plate, friction shoes movable relative to said plate and actuating means comprising a resilient dished disc operatively connected at its outer edge to said shoes, a reciprocable member operatively connected to the inner edge of said disc, a coil spring acting upon said plate and reciprocable member to resiliently urge said plate and disc toward each other and to normally hold said disc in flattened state, a second plate radially guiding said shoes, and means upon said second plate for moving said reciprocable member in a direction to relieve the pressure of said spring.

11. In a friction coupling, the combination of two relatively rotatable elements, one of said elements comprising a friction member adapted to operatively engage the other of said elements, actuating means for said friction member comprising a resilient dished disc operatively connected at one edge to said friction member for radially moving the latter into engagement with the other of said elements, and a reciprocable member operatively connected to the other edge of said disc, said disc being adapted when being flattened to expand and when being allowed to resume its normal dish to contract, and means controlling the flattening of said disc upon movement of said reciprocable member.

12. In a friction coupling, the combination of a rotatable element and a non-rotatable element, said non-rotatable element comprising a plate, an annular series of shoes slidably engaging said plate, cooperating means upon said plate and shoes for holding the latter from peripheral movement relative to the former and for limiting movement of the latter in one direction, and actuating means for said shoes comprising a resilient dished disc operatively connected at one edge to said shoes and adapted when being flattened to expand and when being allowed to resume its normal dish to contract.

13. In a friction coupling, the combination of two relatively rotatable elements, one of said elements comprising a radially movable friction member adapted to operatively engage the other of said elements, actuating means for said friction member comprising a resilient dished disc operatively connected to said friction member to move the same radially in opposite directions, said operative connection providing for peripheral movement of said friction member relative to said disc, said disc being adapted when being flattened to expand and when being allowed to resume its normal dish to contract, and means engageable with said friction member for limiting the peripheral movement of said friction member relative to said disc.

14. In a friction coupling, the combination of two relatively rotatable elements, one of said elements having an internal friction face and the other of said elements comprising a friction member movable radially into engagement with said friction face, and actuating means comprising a resilient dished disc having a spoke operatively connected to said friction member and adapted when said disc is being flattened and expanded to radially move said friction member against said friction face and when said disc is being allowed to resume its normal dish and to contract to radially move said friction member away from said friction face, and means other than said disc engageable with said friction member for limiting the peripheral movement thereof relative to said spoke.

15. In a friction coupling, the combination of two relatively rotatable elements, one of said elements having an internal friction face and the other of said elements comprising shoes movable radially into engagement with said friction face, and actuating means comprising a resilient dished disc having spokes operatively connected to said shoes and adapted when said disc is being flattened and expanded to radially move said shoes against said friction face and when said disc is being allowed to resume its normal dish and to contract to radially move said shoes away from said friction face, said operative connection providing for peripheral movement of said shoes relative to said spokes, and means other than said disc engageable with said shoes for limiting peripheral movement thereof relative to said spokes.

16. In a friction coupling, the combination of two relatively rotatable elements, one of said elements having an internal friction face and the other of said elements comprising shoes movable radially into engagement with said friction face, and actuating means comprising a resilient dished disc having a hub and spokes radiating from said hub and operatively connected to said shoes and adapted upon change in dish of said disc to radially move said shoes relative to said friction face, the portions of said hub between said spokes being peripherally bowed in an axial direction.

17. In a friction coupling, the combination of two relatively rotatable elements, one of said elements having an internal friction face and the other of said elements comprising shoes movable radially into engagement with said friction face, and actuating means comprising a resilient dished disc having a hub and spokes radiating from said hub and operatively connected to said shoes and adapted upon change in dish of said disc to radially move said shoes relative to said friction face, the portions of said hub between said spokes being peripherally bowed in an axial direction progressively from a zone near the inner edge of said hub to the outer edge thereof.

18. In a friction coupling, the combination of two relatively rotatable elements, one of said elements having an internal friction face and the other of said elements comprising shoes movable radially into engagement with said friction face, and actuating means comprising a resilient dished disc having a hub and spokes radiating from said hub and operatively connected to said shoes and adapted upon change in dish of said disc to radially move said shoes relative to said friction face, said spokes being radially slotted to permit easier change in dish.

19. In a friction coupling, the combination of two relatively rotatable elements, one of said elements having an internal friction face and the other of said elements comprising a friction member movable radially into engagement with said friction face, and actuating means comprising a resilient dished disc operatively connected to said friction member and adapted when being flattened to radially move said friction member against said friction face and when being allowed to resume its normal dish to radially move said friction member away from said friction face, a reciprocable member extending substantially axially of said disc, and a yieldable mounting upon said reciprocable member for said disc adapted upon movement of said reciprocable member in one direction to flatten said disc.

20. In a friction coupling, the combination of two relatively rotatable elements, one of said elements having an internal friction face and the other of said elements comprising a friction member movable radially into engagement with said friction face, and actuating means comprising a resilient dished disc operatively connected to said friction member and adapted when being flattened to radially move said friction member against said friction face and when being allowed to resume its normal dish to radially move said friction member away from said friction face, a reciprocable member extending through the central portion of said disc, and resilient means upon said reciprocable member engageable with said disc providing for centering of said disc and friction member with respect to said friction face when said friction member engages said friction face.

21. In a friction coupling, the combination of two relatively rotatable elements, one of said elements having an internal friction face and the other of said elements comprising a friction member movable radially into engagement with said friction face, and actuating means comprising a resilient dished disc operatively connected to said friction member and adapted when being flattened to radially move said friction member against said friction face and when being allowed to resume its normal dish to radially move said friction member away from said friction face, a reciprocable member extending substantially axially of said disc, and a collar upon said reciprocable member having resilient tongues engageable with the inner edge of said disc to normally center said disc relative to said reciprocable member and to provide for centering of said disc and friction member with respect to said friction face when said friction member engages said friction face.

22. In a friction coupling, the combination of two relatively rotatable elements, one of said elements having an internal friction face and the other of said elements comprising a friction member engageable with said friction face, said friction member having a shoe formed of a sheet metal body provided with a generally channel-shaped web and an axial flange, and actuating means comprising a resilient dished disc operatively connected to said body and adapted when being flattened to radially move said friction member against said friction face and when being allowed to resume its normal dish to radially move said friction member away from said friction face.

23. In a brake, the combination of a brake drum, a backing plate, a friction member comprising a shoe movable radially relative to said backing plate and engageable with said brake drum, said shoe having a sheet metal body formed with a generally channel-shaped web and an axial flange, said web having axial portions near its ends radially spaced from said flange to provide recesses, and actuating means comprising a resilient dished disc having portions engaging the recesses and adapted when being flattened to radially move said shoe against said friction face and when being allowed to resume its normal dish to radially move said shoe away from said friction face.

24. In a brake, the combination of a brake drum, a backing plate having a central annular flange, a friction member comprising shoes movable radially relative to said backing plate and engageable with said brake drum, and actuating means for said friction member comprising a resilient dished disc operatively connected to said shoes, a sleeve operatively connected to the inner edge of said disc and slidable on said annular flange, and lever means for reciprocating said sleeve.

25. In a friction coupling, the combination of two relatively rotatable elements, one of said elements comprising a radially movable friction member adapted to operatively engage the other of said elements, and actuating means for said friction member comprising a member the inner portion of which is axially movable and the outer portion of which is radially movable, said outer portion being operatively connected to said friction member and providing for peripheral movement of said friction member relative thereto, and an axially movable yieldable mounting for said actuating member.

26. In a friction coupling, the combination of relatively rotatable elements, one of said elements having an internal friction face and the other of said elements comprising a friction member movable radially into engagement with said friction face, and actuating means comprising a resilient dished disc having a spoke operatively connected to said friction member and adapted when said disc is being flattened and expanded to radially move said friction member against said friction face and when said disc is being allowed to resume its normal dish and to contract to radially move said friction member away from said friction face.

27. In a friction coupling, the combination of relatively rotatable elements, one of said elements having a friction face and the other of said elements comprising a friction member movable into engagement with said friction face, and actuating means comprising a resilient dished disc having a hub and spokes radiating from said hub and operatively connected to said friction member and adapted upon change in dish of said disc to move said friction member relative to said friction face, said hub being expansible upon being flattened, the portions of said hub between said spokes being peripherally bowed in an axial direction to facilitate flattening of said hub.

28. In a friction coupling, a coupling element comprising a resilient dished disc having a hub and spokes radiating from said hub and adapted upon change in dish to vary its outer diameter, the portions of said hub between said spokes being peripherally bowed in an axial direction to facilitate change in dish of said hub, and means for effecting change in dish of said disc.

29. In a friction coupling, the combination of relatively rotatable elements, one of said elements having an internal friction face and the other of said elements comprising a friction member movable radially into engagement with said friction face and a resilient dished disc operatively connected to said friction member and adapted when being flattened to radially move said friction member against said friction face and when being allowed to resume its normal dish to contract and radially move said friction member away from said friction face, a reciprocable member operatively connected to the central portion of said disc, and adjustable means for controlling the movement of said reciprocable member in a direction allowing said disc to resume its normal dish.

30. In a friction coupling, the combination of relatively rotatable elements, one of said elements having an internal friction face and the other of said elements comprising a plate, a friction member movable radially relative to said plate and engageable with said friction face, a resilient dished disc operatively connected to said friction member and adapted when being flattened to expand and radially move said friction member against said friction face and when being allowed to resume its normal dish to contract and radially move said friction member away from said friction face to normal position, a reciprocable member operatively connected to the central portion of said disc, and an adjustable member mounted on said plate for controlling the movement of said reciprocable member in a direction allowing said disc to resume its normal dish.

31. In a friction coupling, the combination of relatively rotatable elements, one of said elements comprising a plate, a radially movable friction member adapted to operatively engage the other of said elements, actuating means for said friction member comprising a member the inner portion of which is axially movable and the outer portion of which is radially movable, said outer portion being operatively connected to said friction member, a reciprocable member operatively connected to the inner portion of said actuating member, a nipple threadedly engaging said plate for controlling the movement of said reciprocable member in one direction, and a longitudinally movable member extending through said nipple for moving said reciprocable member in the opposite direction.

32. In a friction coupling, the combination of relatively rotatable elements, one of said elements having an internal friction face and the other of said elements comprising a friction member radially movable into engagement with said friction face, and actuating means having a dished part operatively connected to said friction member and provided with peripherally spaced portions peripherally bowed in an axial direction relative to the portions between said peripherally spaced portions progressively from a zone radially inwardly of the outer edge of said part to the outer edge thereof to facilitate change in dish of said part.

PHELPS M. FREER.